(12) United States Patent
Fleischmann et al.

(10) Patent No.: US 7,730,330 B1
(45) Date of Patent: Jun. 1, 2010

(54) SYSTEM AND METHOD FOR SAVING AND RESTORING A PROCESSOR STATE WITHOUT EXECUTING ANY INSTRUCTIONS FROM A FIRST INSTRUCTION SET

(76) Inventors: Marc Fleischmann, 445 Oak Grove Ave., Menlo Park, CA (US) 94025; H. Peter Anvin, 4390 Albany Dr., Apt. 46, San Jose, CA (US) 95129

( * ) Notice: Subject to any disclaimer, the term of this patent is extended or adjusted under 35 U.S.C. 154(b) by 77 days.

(21) Appl. No.: 11/201,624

(22) Filed: Aug. 10, 2005

Related U.S. Application Data (63) Continuation of application No. 09/595,198, filed on Jun. 16, 2000, now Pat. No. 6,968,469.

(51) Int. Cl.
  *G06F 1/26* (2006.01)
  *G06F 1/32* (2006.01)
(52) U.S. Cl. .................. 713/300; 713/324; 712/228; 365/228; 365/229
(58) Field of Classification Search ............... 713/320, 713/322, 324; 712/228; 365/228, 229
See application file for complete search history.

(56) References Cited

U.S. PATENT DOCUMENTS

| | | |
|---|---|---|
| 3,863,228 A | 1/1975 | Taylor |
| 4,245,302 A | 1/1981 | Amdahl |
| 4,409,665 A | 10/1983 | Tubbs |
| 4,458,316 A | 7/1984 | Fry et al. |
| 4,467,411 A | 8/1984 | Fry et al. |
| 4,481,573 A | 11/1984 | Fukunaga et al. |
| 4,523,206 A * | 6/1985 | Sasscer ...................... 711/130 |
| 4,530,050 A | 7/1985 | Fukunaga et al. |
| 4,590,549 A | 5/1986 | Burrage et al. |
| 4,598,402 A | 7/1986 | Matsumoto et al. |
| 4,607,331 A | 8/1986 | Goodrich, Jr. et al. |
| 4,720,811 A | 1/1988 | Yamaguchi et al. |
| 4,763,333 A | 8/1988 | Byrd ........................... 714/22 |
| 4,825,412 A | 4/1989 | Sager et al. |
| 4,833,347 A | 5/1989 | Rabe |
| 4,875,160 A | 10/1989 | Brown, III |
| 4,896,257 A | 1/1990 | Ikeda et al. |
| 4,907,150 A | 3/1990 | Arroyo et al. |
| 4,912,628 A | 3/1990 | Briggs |

(Continued)

FOREIGN PATENT DOCUMENTS

AU 5425896 10/1996

(Continued)

OTHER PUBLICATIONS

Advanced Configuration and Power Interface Specification Revision 1.0b, Feb. 2, 1999, pp. 18-20.*

(Continued)

*Primary Examiner*—Mark Connolly (57) ABSTRACT

A CPU (1) automatically preserves the CPU context in a computer memory (5) that remains powered-up when the CPU is powered down in sleep mode. By means of the preserved CPU context, the CPU is able to instantly and transparently resume program execution at the instruction of the program that was asserted for execution when the CPU was powered down. The CPU is permitted to power down frequently, even during execution of a program, and results in reduced average overall power consumption.

157 Claims, 2 Drawing Sheets

U.S. PATENT DOCUMENTS

| | | |
|---|---|---|
| 4,914,577 A | 4/1990 | Stewart et al. |
| 4,928,225 A | 5/1990 | McCarthy et al. |
| 4,937,473 A | 6/1990 | Statz et al. |
| 4,937,789 A | 6/1990 | Matsubara |
| 4,954,942 A | 9/1990 | Masuda et al. |
| 4,992,934 A | 2/1991 | Portanova et al. |
| 5,021,950 A | 6/1991 | Nishikawa |
| 5,041,964 A | 8/1991 | Cole et al. |
| 5,086,501 A | 2/1992 | DeLuca et al. |
| 5,097,409 A | 3/1992 | Schwartz et al. |
| 5,138,708 A | 8/1992 | Vosbury |
| 5,142,672 A | 8/1992 | Johnson et al. |
| 5,142,684 A | 8/1992 | Perry et al. |
| 5,163,153 A | 11/1992 | Cole et al. |
| 5,167,024 A | 11/1992 | Smith et al. |
| 5,175,853 A | 12/1992 | Kardach et al. |
| 5,197,144 A | 3/1993 | Edenfield et al. |
| 5,201,059 A | 4/1993 | Nguyen |
| 5,204,863 A | 4/1993 | Saint-Joigny et al. |
| 5,204,963 A | 4/1993 | Noya et al. .................. 365/229 |
| 5,218,704 A | 6/1993 | Watts, Jr. et al. |
| 5,222,239 A | 6/1993 | Rosch |
| 5,230,055 A | 7/1993 | Katz et al. |
| 5,239,646 A | 8/1993 | Kimura |
| 5,239,652 A | 8/1993 | Seibert et al. |
| 5,247,628 A | 9/1993 | Grohoski |
| 5,247,648 A | 9/1993 | Watkins et al. |
| 5,257,223 A | 10/1993 | Dervisoglu |
| 5,274,815 A | 12/1993 | Trissel et al. |
| 5,276,888 A | 1/1994 | Kardach et al. |
| 5,280,592 A | 1/1994 | Ryba et al. |
| 5,282,274 A | 1/1994 | Liu |
| 5,291,604 A | 3/1994 | Kardach et al. |
| 5,317,720 A | 5/1994 | Stamm et al. |
| 5,321,845 A | 6/1994 | Sawase et al. |
| 5,327,566 A | 7/1994 | Forsyth |
| 5,337,285 A | 8/1994 | Ware et al. |
| 5,349,658 A | 9/1994 | O'Rourke et al. |
| 5,355,468 A | 10/1994 | Jeppesen, III et al. |
| 5,361,340 A | 11/1994 | Kelly et al. |
| 5,410,658 A | 4/1995 | Sawase et al. |
| 5,410,665 A | 4/1995 | Molnar |
| 5,410,713 A | 4/1995 | White et al. |
| 5,422,806 A | 6/1995 | Chen et al. |
| 5,437,017 A | 7/1995 | Moore et al. |
| 5,440,520 A | 8/1995 | Schutz et al. |
| 5,442,766 A | 8/1995 | Chu et al. |
| 5,455,834 A | 10/1995 | Chang et al. |
| 5,461,266 A | 10/1995 | Koreeda et al. |
| 5,463,767 A | 10/1995 | Joichi et al. |
| 5,465,337 A | 11/1995 | Kong |
| 5,467,473 A | 11/1995 | Kahle et al. |
| 5,473,767 A | 12/1995 | Kardach et al. |
| 5,481,685 A | 1/1996 | Nguyen et al. |
| 5,481,719 A | 1/1996 | Ackerman et al. |
| 5,493,660 A | 2/1996 | DeLano et al. |
| 5,497,494 A | 3/1996 | Combs et al. |
| 5,502,838 A | 3/1996 | Kikinis |
| 5,507,030 A | 4/1996 | Sites |
| 5,511,203 A | 4/1996 | Wisor et al. |
| 5,517,615 A | 5/1996 | Sefidvash et al. |
| 5,526,510 A | 6/1996 | Akkary et al. |
| 5,528,127 A | 6/1996 | Streit |
| 5,528,755 A | 6/1996 | Beardsley et al. |
| 5,532,958 A | 7/1996 | Jiang et al. |
| 5,537,559 A | 7/1996 | Kane et al. |
| 5,539,885 A | 7/1996 | Ono et al. |
| 5,542,059 A | 7/1996 | Blomgren |
| 5,546,552 A | 8/1996 | Coon et al. |
| 5,553,255 A | 9/1996 | Jain et al. |
| 5,560,020 A | 9/1996 | Nakatani et al. |
| 5,561,814 A | 10/1996 | Glew et al. |
| 5,563,839 A | 10/1996 | Herdt et al. |
| 5,564,014 A | 10/1996 | Yamashita et al. |
| 5,564,018 A | 10/1996 | Flores et al. |
| 5,564,104 A | 10/1996 | Pourfarzaneh |
| 5,564,111 A | 10/1996 | Glew et al. |
| 5,566,298 A | 10/1996 | Boggs et al. |
| 5,568,614 A | 10/1996 | Mendelson et al. |
| 5,572,719 A | 11/1996 | Biesterfeldt |
| 5,574,922 A | 11/1996 | James |
| 5,574,927 A | 11/1996 | Scantlin |
| 5,577,231 A | 11/1996 | Scalzi et al. |
| 5,581,198 A | 12/1996 | Trimberger |
| 5,581,722 A | 12/1996 | Welland |
| 5,592,173 A | 1/1997 | Lau et al. |
| 5,598,546 A | 1/1997 | Blomgren |
| 5,598,560 A | 1/1997 | Benson |
| 5,600,588 A | 2/1997 | Kawashima |
| 5,604,753 A | 2/1997 | Bauer et al. |
| 5,613,083 A | 3/1997 | Glew et al. |
| 5,613,090 A | 3/1997 | Willems |
| 5,615,162 A | 3/1997 | Houston |
| 5,615,327 A | 3/1997 | Magee et al. |
| 5,617,572 A | 4/1997 | Pearce et al. ................ 713/323 |
| 5,623,628 A | 4/1997 | Brayton et al. |
| 5,625,835 A | 4/1997 | Ebcioglu et al. |
| 5,628,001 A | 5/1997 | Cepuran |
| 5,630,110 A | 5/1997 | Mote, Jr. |
| 5,630,143 A | 5/1997 | Maher et al. |
| 5,632,037 A | 5/1997 | Maher et al. |
| 5,634,131 A | 5/1997 | Matter et al. |
| 5,638,525 A | 6/1997 | Hammond et al. |
| 5,644,742 A | 7/1997 | Shen et al. |
| 5,652,890 A | 7/1997 | Foster et al. |
| 5,657,483 A | 8/1997 | Kardach et al. |
| 5,671,229 A | 9/1997 | Harari et al. ................ 714/710 |
| 5,675,808 A | 10/1997 | Gulick et al. |
| 5,682,093 A | 10/1997 | Kivela |
| 5,682,345 A | 10/1997 | Roohparvar et al. |
| 5,682,351 A | 10/1997 | Han |
| 5,682,471 A | 10/1997 | Billings et al. |
| 5,687,114 A | 11/1997 | Khan |
| 5,692,204 A | 11/1997 | Rawson et al. |
| 5,701,493 A | 12/1997 | Jaggar |
| 5,701,783 A | 12/1997 | Lin |
| 5,704,040 A | 12/1997 | Gunji |
| 5,710,929 A | 1/1998 | Fung |
| 5,713,030 A | 1/1998 | Evoy |
| 5,717,319 A | 2/1998 | Jokinen |
| 5,719,800 A | 2/1998 | Mittal et al. |
| 5,721,927 A | 2/1998 | Baraz et al. |
| 5,726,901 A | 3/1998 | Brown |
| 5,727,208 A | 3/1998 | Brown |
| 5,732,243 A | 3/1998 | McMahan |
| 5,737,615 A | 4/1998 | Tetrick |
| 5,740,391 A | 4/1998 | Hunt |
| 5,740,416 A | 4/1998 | McMahan |
| 5,745,375 A | 4/1998 | Reinhardt et al. |
| 5,751,982 A | 5/1998 | Morley |
| 5,752,011 A | 5/1998 | Thomas et al. |
| 5,752,074 A | 5/1998 | Gallup et al. |
| 5,754,869 A | 5/1998 | Holzhammer et al. |
| 5,757,171 A | 5/1998 | Babcock |
| 5,760,636 A | 6/1998 | Noble et al. |
| 5,761,518 A | 6/1998 | Boehling et al. |
| 5,765,001 A | 6/1998 | Clark et al. ................ 713/340 |
| 5,765,004 A | 6/1998 | Foster et al. |
| 5,768,567 A | 6/1998 | Klein et al. |
| 5,774,703 A | 6/1998 | Weiss et al. |
| 5,778,237 A | 7/1998 | Yamamoto et al. |
| 5,787,294 A | 7/1998 | Evoy |
| 5,790,825 A | 8/1998 | Traut |
| 5,792,970 A | 8/1998 | Mizobata |

| | | |
|---|---|---|
| 5,799,188 A | 8/1998 | Manikundalam et al. |
| 5,799,200 A | 8/1998 | Brant et al. |
| 5,805,490 A | 9/1998 | Machida |
| 5,812,860 A | 9/1998 | Horden et al. |
| 5,815,724 A | 9/1998 | Mates |
| 5,825,674 A | 10/1998 | Jackson |
| 5,828,861 A | 10/1998 | Miyayama et al. |
| 5,832,205 A | 11/1998 | Kelly et al. |
| 5,832,284 A | 11/1998 | Michail et al. |
| 5,835,951 A | 11/1998 | McMahan |
| 5,835,967 A | 11/1998 | McMahan |
| 5,838,948 A | 11/1998 | Bunza |
| 5,842,029 A | 11/1998 | Conary et al. |
| 5,844,422 A | 12/1998 | Trimberger et al. |
| 5,848,281 A | 12/1998 | Smalley et al. |
| 5,852,737 A | 12/1998 | Bikowsky |
| 5,864,659 A | 1/1999 | Kini ............... 714/31 |
| 5,875,340 A | 2/1999 | Quarnstrom et al. |
| 5,878,264 A * | 3/1999 | Ebrahim ............... 713/323 |
| 5,884,049 A | 3/1999 | Atkinson |
| 5,887,152 A | 3/1999 | Tran |
| 5,894,577 A | 4/1999 | MacDonald et al. |
| 5,898,880 A | 4/1999 | Ryu ............... 713/323 |
| 5,903,766 A | 5/1999 | Walker et al. |
| 5,913,067 A | 6/1999 | Klein |
| 5,914,996 A | 6/1999 | Huang |
| 5,915,262 A | 6/1999 | Bridgers et al. |
| 5,919,262 A | 7/1999 | Kikinis et al. |
| 5,923,545 A | 7/1999 | Nguyen |
| 5,930,832 A | 7/1999 | Heaslip et al. |
| 5,933,649 A | 8/1999 | Lim et al. |
| 5,935,259 A | 8/1999 | Anderson ............... 713/340 |
| 5,939,915 A | 8/1999 | Curran |
| 5,940,785 A | 8/1999 | Georgiou et al. |
| 5,940,786 A | 8/1999 | Steeby |
| 5,951,702 A | 9/1999 | Lim et al. |
| 5,958,061 A | 9/1999 | Kelly et al. |
| 5,963,737 A | 10/1999 | Mealey et al. |
| 5,974,557 A | 10/1999 | Thomas et al. |
| 5,978,923 A | 11/1999 | Kou |
| 5,986,962 A | 11/1999 | Bertin et al. |
| 5,991,531 A | 11/1999 | Song et al. ............... 703/26 |
| 5,996,083 A | 11/1999 | Gupta et al. |
| 5,996,084 A | 11/1999 | Watts |
| 6,021,500 A | 2/2000 | Wang et al. |
| 6,026,018 A | 2/2000 | Herdt et al. |
| 6,031,992 A | 2/2000 | Cmelik et al. |
| 6,034,886 A | 3/2000 | Chan et al. |
| 6,035,407 A | 3/2000 | Gebara et al. ............... 713/300 |
| 6,038,661 A | 3/2000 | Yoshioka et al. |
| 6,047,248 A | 4/2000 | Georgiou et al. |
| 6,058,063 A | 5/2000 | Jang |
| 6,078,319 A | 6/2000 | Bril et al. |
| 6,079,003 A | 6/2000 | Witt et al. |
| 6,081,890 A * | 6/2000 | Datta ............... 713/1 |
| 6,088,806 A | 7/2000 | Chee |
| 6,088,807 A | 7/2000 | Maher et al. |
| 6,094,367 A | 7/2000 | Hsu et al. |
| 6,111,806 A | 8/2000 | Shirley et al. |
| 6,112,164 A | 8/2000 | Hobson |
| 6,118,306 A | 9/2000 | Orton et al. |
| 6,119,241 A | 9/2000 | Michail et al. |
| 6,128,243 A | 10/2000 | Chan et al. |
| 6,128,746 A | 10/2000 | Clark et al. |
| 6,141,762 A | 10/2000 | Nicol et al. |
| 6,157,092 A | 12/2000 | Hofmann |
| 6,173,376 B1 | 1/2001 | Fowler et al. |
| 6,182,231 B1 | 1/2001 | Gilgen ............... 713/324 |
| 6,199,152 B1 | 3/2001 | Kelly et al. |
| 6,202,090 B1 | 3/2001 | Simone |
| 6,202,104 B1 | 3/2001 | Ober |
| 6,208,127 B1 | 3/2001 | Doluca |
| 6,208,543 B1 | 3/2001 | Tupuri et al. |
| 6,216,235 B1 | 4/2001 | Thomas et al. |
| 6,231,147 B1 | 5/2001 | Bosshart |
| 6,233,293 B1 | 5/2001 | Myers et al. |
| 6,243,831 B1 | 6/2001 | Mustafa et al. |
| 6,246,627 B1 | 6/2001 | Yamauchi et al. |
| 6,249,473 B1 | 6/2001 | Lau et al. |
| 6,256,252 B1 | 7/2001 | Arimoto |
| 6,266,752 B1 | 7/2001 | Witt et al. |
| 6,266,776 B1 | 7/2001 | Sakai ............... 713/300 |
| 6,272,642 B2 | 8/2001 | Pole et al. |
| 6,279,048 B1 | 8/2001 | Fadavi-Ardekani et al. |
| 6,279,078 B1 | 8/2001 | Sicola et al. |
| 6,304,824 B1 | 10/2001 | Bausch et al. |
| 6,308,279 B1 | 10/2001 | Toll et al. |
| 6,308,285 B1 | 10/2001 | Bowers |
| 6,311,281 B1 | 10/2001 | Pole, II et al. |
| 6,311,287 B1 | 10/2001 | Dischler et al. |
| 6,314,522 B1 | 11/2001 | Chu et al. |
| 6,343,363 B1 | 1/2002 | Maher et al. |
| 6,345,363 B1 | 2/2002 | Levy-Kendler |
| 6,347,379 B1 | 2/2002 | Dai et al. |
| 6,353,552 B2 | 3/2002 | Sample et al. |
| 6,378,081 B1 | 4/2002 | Hammond |
| 6,388,432 B2 | 5/2002 | Uchida |
| 6,397,242 B1 | 5/2002 | Devine et al. ............... 709/1 |
| 6,405,320 B1 | 6/2002 | Lee et al. ............... 713/300 |
| 6,415,379 B1 | 7/2002 | Keppel et al. |
| 6,415,388 B1 | 7/2002 | Browning et al. |
| 6,425,086 B1 | 7/2002 | Clark et al. |
| 6,427,211 B2 | 7/2002 | Watts, Jr. |
| 6,437,623 B1 | 8/2002 | Hsu et al. |
| 6,442,746 B1 | 8/2002 | James et al. |
| 6,457,082 B1 | 9/2002 | Zhang et al. |
| 6,457,135 B1 | 9/2002 | Cooper |
| 6,477,654 B1 | 11/2002 | Dean et al. |
| 6,484,265 B2 | 11/2002 | Borkar et al. |
| 6,484,274 B1 * | 11/2002 | Lee et al. ............... 714/38 |
| 6,487,668 B2 | 11/2002 | Thomas et al. |
| 6,501,999 B1 * | 12/2002 | Cai ............... 700/82 |
| 6,510,400 B1 | 1/2003 | Moriyama |
| 6,510,525 B1 | 1/2003 | Nookala et al. |
| 6,513,124 B1 | 1/2003 | Furuichi et al. |
| 6,519,706 B1 | 2/2003 | Ogoro |
| 6,564,328 B1 | 5/2003 | Grochowski et al. |
| 6,571,316 B1 | 5/2003 | D'Souza et al. |
| 6,574,739 B1 | 6/2003 | Kung et al. |
| 6,577,153 B2 | 6/2003 | Kodama |
| 6,580,650 B2 | 6/2003 | Ellis et al. |
| 6,615,360 B1 | 9/2003 | Banning et al. |
| 6,675,304 B1 | 1/2004 | Pole et al. |
| 6,694,443 B1 | 2/2004 | Maher et al. |
| 6,704,880 B2 | 3/2004 | Dai et al. |
| 6,718,457 B2 | 4/2004 | Tremblay et al. |
| 6,775,786 B2 | 8/2004 | Toll et al. |
| 6,826,682 B1 | 11/2004 | Rozas et al. |
| 6,880,152 B1 | 4/2005 | Torvalds et al. |
| 6,910,141 B2 | 6/2005 | Maher et al. |
| 6,978,390 B2 | 12/2005 | Maher et al. |
| 7,000,132 B2 | 2/2006 | Maher et al. |
| 7,062,666 B2 | 6/2006 | Maher et al. |
| 7,120,810 B2 | 10/2006 | Maher et al. |
| 2002/0026597 A1 | 2/2002 | Dai et al. |
| 2002/0073348 A1 | 6/2002 | Tani |
| 2002/0083356 A1 | 6/2002 | Dai |
| 2002/0087896 A1 | 7/2002 | Cline et al. |
| 2002/0138778 A1 | 9/2002 | Cole et al. |
| 2003/0065960 A1 | 4/2003 | Rusu et al. |
| 2003/0074591 A1 | 4/2003 | McClendon et al. |

FOREIGN PATENT DOCUMENTS

| | | |
|---|---|---|
| DE | 69614515 | 4/2002 |
| EP | 0381021 | 8/1990 |

| | | |
|---|---|---|
| EP | 0474963 | 3/1992 |
| EP | 0504655 | 9/1992 |
| EP | 632360 | 1/1995 |
| EP | 0651331 | 5/1995 |
| EP | 0742512 | 11/1996 |
| EP | 978781 | 2/2000 |
| JP | 53-63820 | 6/1978 |
| JP | 60-54048 | 3/1985 |
| JP | 01100638 | 4/1989 |
| JP | 01255933 | 10/1989 |
| JP | 02-213942 | 8/1990 |
| JP | 03-30022 | 2/1991 |
| JP | 03-269628 | 2/1991 |
| JP | 03255535 | 11/1991 |
| JP | 04-246728 | 9/1992 |
| JP | 7-505242 | 6/1995 |
| JP | 8314721 | 11/1996 |
| JP | 409185589 | 7/1997 |
| WO | WO01/27728 | 4/2001 |

OTHER PUBLICATIONS

Tanenbaum, Andrew; 1984, "Structured computer Organization", Prentice-Hall Inc., 2$^{nd}$ Ed.,p. 11.
Intel, Microsoft, "Advanced Power Management (AMP) Bios Interface Specification", Revision 1.2, Feb. 1996.
Intel, Microsoft, Toshiba, "Advanced Configuration and Power Interface Specification", Revision 1.0a, Jul. 1, 1998.
Intel, Microsoft, Toshiba, "Advanced Configuration and Power Interface Specification - Final Draft", Revision x1.96, Jun. 8, 2000.
Aspinwall et al., Modifications to the Vax-11/780 Micro Architecture to Support IEEE Floating Point Arithmetic, 1983, Association for Computing Machinery.
"Gathering Store Instructions in a Superscalar Processor" IBM Technical Disclosure Bulletin, IBM Corp. New York, US, vol. 39, No. 9, Sep. 1, 1996, pp. 103-104, XP0006382245, ISSN: 0018-8689.
"Parallel Processing Mechansim" compiled by Yoshizo Takahashi, First edition published on Aug. 25, 1989 by Maruzen (pp. 186-199).
Ando H et al. "Uncontrained Speculative Execution with Predicated State Buffering" Proceedings of the 22nd. Annual Symposium on Computer Architecture. Santa Magherita Ligure, IT, Jun. 22-24, 1995, Proceedings of the Annual Symposium on Computer Architecture, New York, ACM, US, vol. SYP. 22, Jun. 22, 1995, pp. 126-137, XP000687802 ISBN:0-7803-3000-5.
Andrews K. et al., Migrating a CISC Computer Family onto RISC via Object Code Translation, ASPLOS V 1992 ACM.
Bedichek R.C., Talisman: Fast and accurate multicomputer simulation, MIT 1995.
Cathy May: "MIMIC: A fast system/370 simulator" proceedings of the objecte orineted programming systems languages and applications conference (OOPSLA), US, reading, ACM, vol. CONF. 2, Jun. 24, 1987, pp. 1-13, XP002009322.
Cmelik R et al., Shade: A Fast Instruction Set Simulator for Execution Profiling, ACM, 1994.
Ebcioglu et al., "Daisy: Dynamic Compilation for 100% Architectural Compatibilty" 24th Annual International Symposium on Computer Architecture Denver, Jun. 2-4, 1997, Annual International Symposium on Computer Architecture, New York, ACM, US, vol. CONF. 24, Jun. 2, 1997, pp. 26-37, XP00738145 ISBN: 0-7803-4175-9.
Gabriel M. Silberman, Kemal Ebcioglu: 'An Architectural Framework for Migration from CISC to Higher Performance Platforms' International Conference on Supercomputing, Conference Proceedings, Jul. 19, 1992.
Halfhill T.R., Emulation: RISC's Secret Weapon, BYTE, Apr. 1994. pp. 119-130.

Kemal Ebcicgulu, Erik R. Altman: 'Daisy: Dynamic Compilation for 100% Architecture Compatabilty' Internet Document: IBM Research Report.
Gabriel M. Silberman, Kemal Ebciogulu: "An architectural framwork for supporting heterogeneous instruction-set architectures" Computer, US, IEEE, Computer Society, Long Beach, CA, US, vol. 26, No. 6, Jun. 1, 1993 pp. 39-56, XP000377627, ISSN: 0018-9162.
Kristy Andrews, Duane Sand: "Migrating a CISC computer family into RISC via object code translation" ACM sigplan notices, US, Association for coputeing machinery, New York, vol. 27, No. 9, Sep. 1, 1992, pp.213-222, xp000330602, ISSN:0362-1340.
Kumar et al, emulation Verification of the Motorola 68060, Proceedings, ICCD, 1995, pp. 150-158.
Note et al., Rapid Protyping of DSP systems: Requirements and Solutions, 6th IEEE International Workshop on RSP, 1995, pp. 40-47.
Rosenberg, J.M., Dictionary of Computers, Information Processing and Telecommunications, John Wiley & Sons, p. 382.
Silberman G M et al. "An Architectural Framework for Migration from CISC to Higher Performance Platforms International Conference on Supercomputing, Conference Proceedings", (Jul. 19, 1992) pp. 198-215 XP000576925.
Tremblay et al., A Fast and Flexible Performance Simulator for Micro-Architecture Trade-off Analysis on Ultrasparc-1' 1995, p. 2.
Witchel et al., Embra: Fast and Flexible Machine Simulation, Sigmetrics, 1996, pp. 68-79.
Paul Levy, "Power-Down Integrated Circuit Built-in-Self-Test Structures" 1991 IEEE VLSI Test Symposium. pp. 30-33.
Satoshi Shigematsu; et al. A 1-V High Speed MTCMOS Circuit Scheme for Power-Down Applications. 1995 Symposuim on VLSI Circuits Digest of Technical Papers. NTT LSI Laboratories, 3-1, Morinosato Wakamiya, Atsugi-shi, 243-01 Japan.
Madhav P. Desai et al., "Sizing of Clock Distribution Networks for high Performance CPU Chips" Digital Equipment Corporation 1996, pp. 389-394.
"Re: AX64Pro or AK72?", NewsReader, Jun. 15, 2000, pp. 1-2.
AMD Athlon; "Processor Module" datasheet, Jun. 2000, pp. 1-64.
Intel, "Pentium III Processor for the SC242 at 450 MHz to 866 MHz and 1.0 GHz", Datasheet, Mar. 2000, pp. 1-30.
"High-speed step-doen controller with synchronous rectification for CPU power", Maxim, pp. 1-16.
"High-speed, Digitally Adjusted step-down controllers for notebook CPUs", Maxim, Jul. 2000, pp. 1-28.
"High-Speed Digitally Adjusted Step-Down Controllers for Notebook CPUS"; Max1710/Max1711; MAXIM Manual; p. 11 and p. 21.
"Operatio U (Refer to Functional Diagram)" LTC1736; Linear Technology Manual p. 9.
Weiser et al.; "Scheduling for Reduced CPU Energy"; Xerox PARC, Palo Alto, CA; Appears in Proceedings of the First Symposium on operating Systems Design and Implementation; Usenix Assoc. Nov. 1994.
Govil; "Comparing Algorithms for Dynamic Speedsetting of a Low Power CPU"; International Computer Science Institute; Berkeley, CA; Apr. 1995.
Intel Corporation; "Intel 82801 CAM I/O Controller Hub (ICH3-M)" Datasheet; Jul. 2001.
AMD Athlon-Processor Model 4 Data Sheet, No. 23792, Rev. K, Nov. 2001, Advanced Micro Devices, Inc.
"Manual for KINETIIZ 7T", 2000, QDI Computer, Inc. (USA).
"VT82C686A 'Super South' South Bridge", Feb. 25, 2000, Rev. 1.54, VIA Technologies, Inc.
Non-Final Office Action Mailed Mar. 25, 2003; Patent No. 6968469.
Final Office Action Mailed Nov. 20, 2003; Patent No. 6968469.
Non-Final Office Action Mailed Jun. 3, 2004; Patent No. 6968469.
Notice of Allowance Mailed May 13, 2005; Patent No. 6968469.

* cited by examiner

SYSTEM AND METHOD FOR SAVING AND RESTORING A PROCESSOR STATE WITHOUT EXECUTING ANY INSTRUCTIONS FROM A FIRST INSTRUCTION SET

This application is a continuation application of the U.S. patent application Ser. No. 09/595,198, filed Jun. 16, 2000, by Fleischmann et al., now U.S. Pat. No. 6,968,469 and entitled "Instant Suspend to RAM," hereby incorporated by reference in its entirety.

FIELD OF THE INVENTION

This invention relates to sleep modes for digital computers and, more particularly, to a novel method and apparatus for reducing battery power drain in portable computers during periods in which the computer is left idle for a time, even momentarily, while restoring CPU operation instantaneously once processing is to resume.

BACKGROUND

Portable digital computers rely on rechargeable DC batteries to provide the electrical power necessary for operation. When the computer is powered on for processing operation, but allowed to remain idle, the battery continues nonetheless to supply current to all the components of the computer, including the central processing unit (CPU), memory, the chipset (e.g. the Southbridge) and the display of the computer. If the user fails to turn off the computer, the battery continues to supply full current and, eventually, becomes drained of the stored electrical power. The foregoing action leads to more frequent charging of the battery, and reduces the utility and usability of the computer system.

To reduce battery drain under such circumstances, a power management technique was previously introduced for portable computers, called the "sleep" mode. Typically, portable computers based on the INTEL X86 CPU and associated chip set, referred to as "PC's", include multiple sleep modes (e.g. states of sleep mode). The multiple sleep modes enable the portable computer, when left idle, to selectively power down the components and devices of the computer in stages, although the main power remains on. With the computer spending an increasing amount of time idling, the computer progresses through increasingly deeper and deeper stages of sleep mode (and hence, greater reductions in power consumption). One of the deepest of those modes is characterized by all of the devices, including the CPU, but excepting the main memory (RAM) and the Southbridge chip, being powered down. This latter mode is typically referred to as "Suspend to RAM" ("STR") or as "Power-on-Suspend" ("POS") or like terms. In the STR condition power consumption is dramatically reduced and offers the greatest power reduction short of that power reduction obtained by turning off every component of the computer, the latter being referred to as "suspend to disk", essentially completely shutting down the computer.

The sleep modes in the PC are defined and controlled by the operating system software, such as familiar Windows 9X, Unix, Linux and the like, in conjunction with the system BIOS of the computer. When in STR, the Southbridge portion of the chip set, which is responsible for power management of the PC, continues to monitor the keyboard and mouse (and/or resume key) of the PC for any user activity, signifying an end to the computer idle condition.

When the user later returns to perform computing and observes the computer is in a sleep mode, the user operates a "resume" key (or any key of the keyboard) or the like. That action initiates a chain of events in the computer transparent to the user, that restores full power to the CPU; and the computer recovers quickly. Return from the upper stages of the sleep mode recovers more quickly than recovery from the STR stage, the deepest stage after the Suspend to Disk stage, the latter recovery procedure being referred to as a "resume from STR".

Of particular convenience, the user may immediately resume computing at the precise location in any application program that was active in the computer at the time the computer entered the sleep mode. To reach that point from the STR stage of sleep mode, the CPU processes a number of steps of the "boot-up" routine for the computer; steps that typically occur in a manner transparent to the user. The computer is able to resume where it left off, because, prior to entering STR, the computer preserved the complete state of all software applications and of all components and devices, including the CPU, in a memory that remained powered up during the "sleep".

For the power management technique of sleep mode, the CPU and the external memory (DRAM) are independently supplied with power, that is, are located in separate power domains. In the deepest sleep mode, STR, power is removed from the CPU (and other electronic components of the computer, such as the display), while maintaining the DRAM memory and the Southbridge chip under power. The application programs and the state of those application programs (e.g. the CPU "context") is preserved by transferring the state information to the DRAM.

In processing operation, the CPU executes application programs by continuously modifying both its internal state and memory contents according to the instructions of the program. The internal CPU memory of the X86 system resides in the same power domain as the CPU. Thus, whenever the CPU is powered down, such as for an STR procedure, the internal memory is also powered down, and normally results in the loss of that CPU context. In order for the CPU of the X86 system to resume processing of an application program on Resume from STR, the processor must at that time at least "know" the state of the program on entering STR. Before entering STR, the CPU executes an instruction (of the power management software) that saves the CPU context at a well defined location in external memory, such as the DRAM memory. That context information subsumes the state of the operating system and the state of the application program. By maintaining power to the DRAM during STR, the state information of the program is preserved, and is available for use later upon a Resume from STR.

Once the resume button is pressed and is detected by the Southbridge chip, power is reapplied to the CPU, which commences its start-up routines. The CPU processes the normal boot-up routine stored in the ROM of the BIOS chip. That boot up procedure initializes the internal registers of the CPU and flushes its caches, thereby establishing a baseline state for the CPU. The process takes a noticeable time in which to complete. However, prior to loading the operating system, such as Windows 9x, the routine checks to determine if the boot-up procedure is a "power up reset" as occurs upon initially powering up the computer, or instead is a Resume from STR. When the routine detects the latter condition, the computer "knows" that the state of the operating system software, any application program, and the corresponding CPU context already resides in the external memory (DRAM). The CPU then completes the boot-up procedure by restoring the device states, and, with a special instruction, finally restores the CPU context from the external memory. Thereafter, the CPU is able to simply proceed with executing the next application program instruction exactly where the CPU left off when entering STR.

In a stage of sleep mode that lies one stage above the STR stage, the penultimate stage (e.g. the pre-STR stage) referred to as "deep sleep", existing operating systems issue an instruction to remove the system clock from the CPU, but to maintain the CPU powered up, continuing to consume battery power. The removal of the system clock reduces power consumption also, but that is not as great a reduction as when power is removed from the CPU, such as during STR. Without clock signals being applied, the CPU is no longer able to process (as would consume additional current), but maintains system context in the associated internal registers of the CPU. That context is not lost and is not required to be saved to external memory as is the case in entering the STR stage. As an advantage, the invention powers down the CPU in all sleep modes and preserves the CPU context, saving additional power.

Accordingly, an object of the invention is to reduce the power consumption of a computer during periods in which the computer is idle, providing a more effective sleep mode.

Another object of the invention is to promote the pre-STR stage of sleep mode in existing power management systems to the STR stage, creating an "Instant STR", and reduce the time required by the computer system to return from that stage, ideally providing a Resume from STR that appears instantaneous.

And, a related object of the invention is to replace on-the-fly a CPU context maintaining sleep mode of existing computer systems that is governed by the operating system with a substitute sleep mode that affords a lower power consumption and remains transparent to the software.

SUMMARY OF THE INVENTION

In accordance with the foregoing objects and advantages, the present invention provides for saving the internal context of the CPU (which includes the state of the application software) and powering down the CPU not only for an STR condition but for any pre-STR stage of sleep mode, and for restoring the state, including such internal context, on the Resume from STR condition, whereby the processor system is quickly restored for operation ready to execute the next instruction of the application program. With the invention, any stage of sleep mode can be promoted to an STR condition to completely power down the CPU in a manner that is transparent to the operating system.

When applied to directly to existing X86 applications and operating systems, the present invention intercepts (or converts) an instruction that calls for an X86 type computer system to enter a CPU context-maintaining sleep mode, a pre-STR stage of sleep mode, and "promotes" or converts that instruction into an instruction to enter the STR stage, and thereafter perform all of the actions described for entering STR. Whereas the X86 operating system of the CPU may "think" that the context of the application program has been saved in one way, the present system actually saves that program context and the CPU context in a different manner, transparent to the X86 operating system. When Resuming from STR, the context is restored, and the X86 operating system is none the wiser.

In accordance with a more specific aspect, the present invention provides a private memory within the processor system, a memory external to the CPU, that is accessible only to the CPU and is powered independently of the CPU to store the CPU context when the CPU is powered down in a sleep mode. The private memory may constitute a logical portion of the external memory, DRAM, in the X86 system, or may be physically separate therefrom or may constitute a logical partition of the CPU internal memory, such as a cache or subset of such cache. Like the existing DRAM, a key characteristic of the foregoing memory is that such memory is independently powered from the CPU core. In the Transmeta processing system, hereafter noted, that memory may be commandeered to serve as private memory for code morphing software (e.g. "CMS memory"). The power clown routine for sleep mode includes reading the internal CPU context from the internal memory of the CPU, caches and registers, and writing that context within the private memory. When powered up, either initially or on return from STR, the processor determines whether to perform a normal power up operation, called a power on reset, or a context-restoring operation.

On entering into the Instant STR condition, before concomitant powering down of the CPU of the computer, the CPU preserves the entire CPU context in the independently powered private external memory of the CPU. So long as the private memory remains powered up, the CPU context is preserved despite the fact that the CPU is powered down. Upon Resume from Instant STR to resume processing, power is restored to the CPU. During the boot-up process, the CPU detects that the condition is a resume from Instant STR and, in response, restores its entire internal state from the preserved CPU context located in the private memory. Thereafter the CPU may perform an internal resume to the instruction of the application program that follows the last completed instruction of that program.

As an advantage the CPU is able to automatically and transparently recover from a sleep mode that powers down the CPU and continue execution of any arbitrary computer program after lapses of arbitrary duration in the sleep mode without any assistance being required of the operating system, BIOS or the like.

The present invention is particularly adaptable to incorporation within and enhances a newly disclosed processor system that is found to already contain a private memory that is powered separately from the processor, but is used to store, among other things, only a part of the internal context of the CPU. That processor system is the very long instruction word (VLIW) processor described, for one, in U.S. Pat. No. 6,031, 992, granted Feb. 29, 2000, entitled Combining Hardware and Software to provide an Improved Microprocessor, assigned to Transmeta Corporation, (referred to as the 992 Transmeta patent), which is incorporated herein by reference.

The processor of the 992 Transmeta patent is formed by a combination of a hardware processing portion (called a "morph host"), and an emulating software portion, referred to therein as code morphing software. Among other things, the code morphing software carries out a significant portion of the functions of processors in software, reducing the hardware required for processing and the greater electrical power that such hardware requires. The Transmeta processor serves as the host processor system capable of executing software programs (the "target application") designed with an instruction set intended to run on a processor system of different design, the target processor, one that contains an instruction set unique to the target processor, but foreign to the host system, such as the X86 type processor.

That processor translates instructions that comprise a target software program "on-the-fly" into instructions of the host instruction set (the host instructions); and then executes the latter instructions. In so doing, the morph host processor executes the code morphing software which, functioning as either a software "interpreter" or "translator" of target application programs into host processor instructions, which are able to accomplish the purpose of the original application software. For translation, the code morphing software defines a translator, which converts the target instructions to host instructions, and a translation process that translates the target application programs dynamically and optimizes the latter host instructions to provide an optimized translation.

The foregoing Transmeta processing system, hereafter referred to as the Transmeta processor, necessarily keeps track of its state or CPU context during processing operation. It is found that the Transmeta processor places a considerable portion of its CPU context on memory external of the CPU, such as DRAM. Conceptually, that external memory is herein referred to as "private" CPU memory, because that memory is not visible to (and cannot be accessed by) external application programs; and only the code morphing software of the CPU is able to access the private memory. Further the CPU private memory resides in a different power domain than the CPU, and, therefore, may be powered up or down independently of the CPU. Consequently, the private memory is able to maintain a portion of the internal state of the CPU when the CPU is powered down.

Other portions of the CPU context are saved in memory (caches) internal to the CPU, apart from the private memory. Normally that portion of the CPU context (information) would disappear whenever the Transmeta processor is powered down. In accordance with the present invention, the entire CPU context of the Transmeta processor is stored in the private memory in the Instant STR process. Accordingly, a further object of the invention is to provide a portable computer constructed in accordance with the Transmeta processing system with an improved power saving sleep mode.

When powered up, either initially or on return from Instant STR, the processor determines whether it is to perform a normal power up operation (a power on reset) or a context-restoring operation. Traditional processors typically employ external circuitry to make that decision. The Transmeta processor deposits the corresponding persistent information in the private memory. The presence of that information in the private memory is called an "STR signature".

As an advantage, the Transmeta CPU is able to automatically and transparently recover from a sleep mode in which the CPU is powered down and continue execution of any arbitrary application program, including target applications, after time lapses of arbitrary duration in the sleep mode without any assistance required of the application program. Upon resume from such a sleep mode, the Transmeta processor is able to continue with execution of a target application program. The Transmeta processor is capable of suspending arbitrary X86 computer programs to private memory (e.g. CMS memory) and automatically and transparently resume executing the next instruction of the program without any assistance of the target application.

The foregoing and additional objects and advantages of the invention together with the structure characteristic thereof, which was only briefly summarized in the foregoing passages, will become more apparent to those skilled in the art upon reading the detailed description of a preferred embodiment of the invention, which follows in this specification, taken together with the illustrations thereof presented in the accompanying drawings.

DETAILED DESCRIPTION OF THE PREFERRED EMBODIMENTS

The invention is preferably implemented within the improved 992 Transmeta processor system earlier described, which implements software-enhanced execution (eg. dynamic translation), and is best explained in connection with that processor. The principal elements of that processing system as modified to incorporate the invention are symbolically illustrated in FIG. 1, to which reference is made. The processing system contains a computer processing unit ("CPU") 1, a memory 3 for the X86 program, the target machine code that the processor is to translate, its data, and a memory 5 with the private runtime support for the computer, the latter memory herein referred to as private memory. Memory 3 may encompass the entire memory hierarchy, including disk, RAM, $2^{nd}$ level cache and $1^{st}$ level cache. ROM memory, which is used by the processor, is considered as being separate from the processor, and for purposes of this description is not considered as part of the memory hierarchy of the processor. The foregoing illustration also excludes the memory that is regarded as internal to the CPU ("internal" memory).

Figure 1:
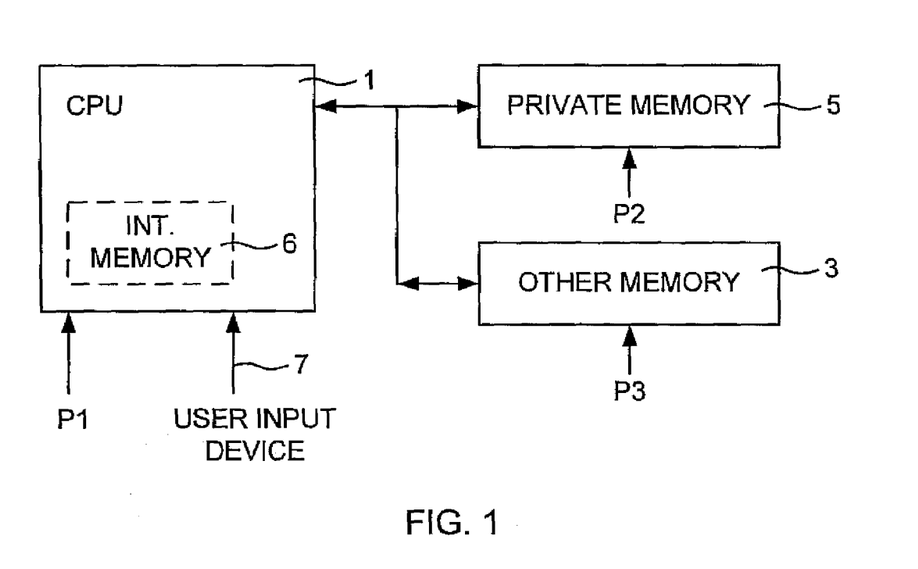
FIG. 1 is a high-level block diagram of a digital processor which incorporates the invention.

The foregoing architecture is recognized as different from the traditional processor systems, such as the X86 system, which does not contain memory 5. As represented by the power arrows P1, the private memory 5 resides in a separate power domain than CPU 1 (and memory 3). Hence, electrical power to each component of the system may be separately and independently controlled, more specifically, CPU 1 may be powered down, while private memory 5 remains powered.

During processing operation, the Transmeta CPU 1 keeps track of its state or context. Since the Transmeta computer "virtualizes" the target processor, such as the X86 processor system, the computer must also keep track of the state of the X86 processor system, possibly including part of the chipset and the target (X86) application program for that processor, which is being translated and executed by the code morphing software. Hence, the context of the Transmeta processor constitutes a super-set of and subsumes the state of the X86 processor system.

The context of the Transmeta processing system is reflected in the contents of the general purpose registers, including core special registers ("CSR's"), peripheral special registers ("PSR's"), and the Northbridge registers, the D-cache, the 1-cache, local program memory ("LPM"), and local data memory ("LDM"). Some of that con text is stored in private memory 5. However, the internal context of CPU 1 is stored in internal memory, represented in the clotted block 6 within CPU 1.

The Transmeta computer includes a start up procedure to initialize and configure ("set up") the computer and begin processing, a procedure defined by software or in firmware, such as ROM code, which is included. That start-up procedure ("boot-up") is initiated once power to the computer is switched on to apply power (P1, P2, and P3) to both the CPU 1 and memories 3 and 5, a "boot-up" procedure referred to as "power-on reset".

Figure 2:
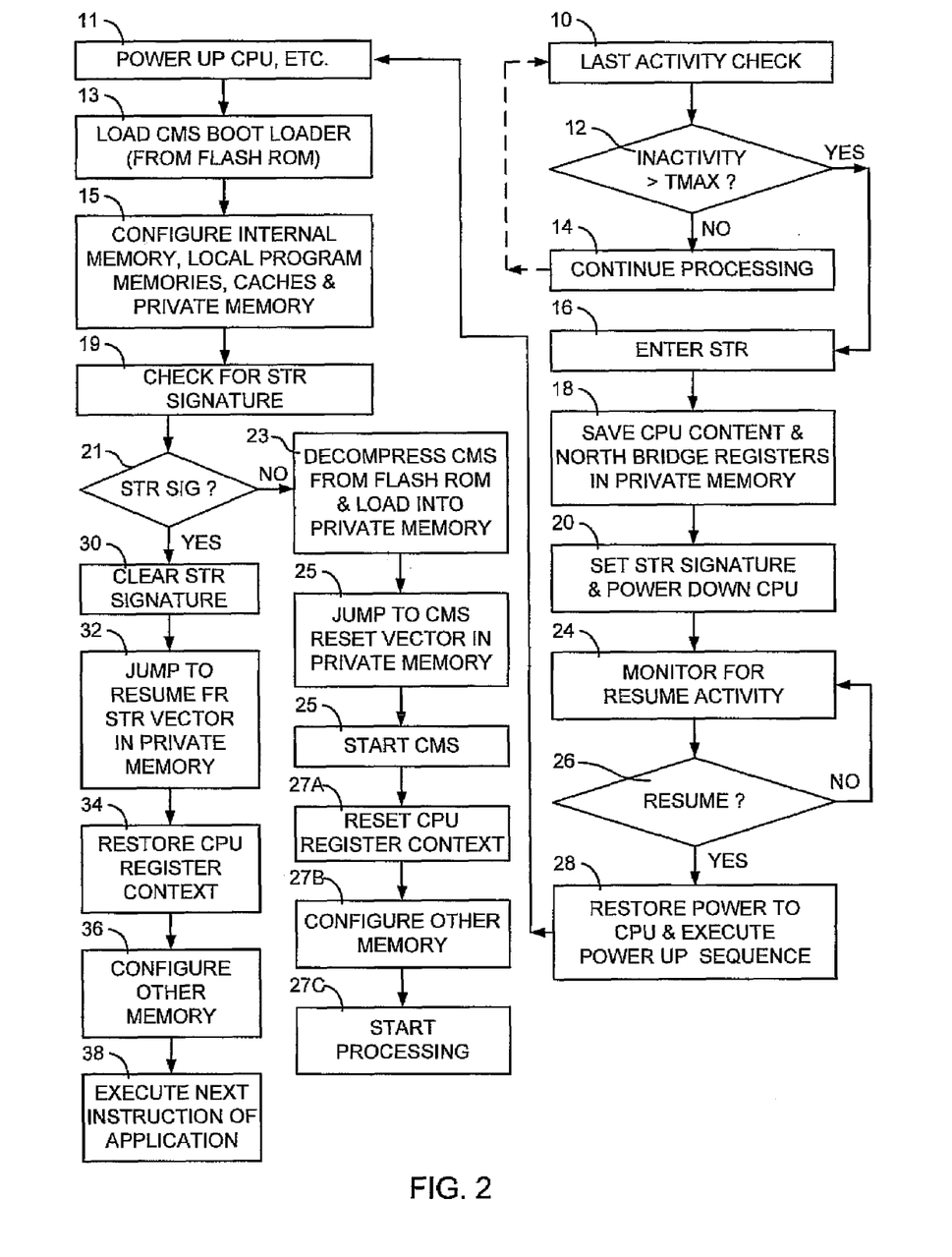
FIG. 2 is a flow chart defining the operation of the processor of FIG. 1.

The processor commences the start up procedure, as represented by operation 11 in FIG. 2 to which reference is made. Both the code morphing software and the CMS boot loader software of the Transmeta processing system are stored in compressed form in flash ROM (not illustrated) of the computer.

The CPU locates the CMS boot loader routine in the flash ROM and installs that routine in internal memory 6, as represented at block 13. As represented by operation 15, the CMS boot loader continues with configuring the cache, the private memory 5, and, possibly, the other memory.

At this juncture, and in accordance with the invention, the boot loader looks for an "STR signature", operation 19, which is later described herein in greater detail in connection with a Resume from STR condition. However, since the initial power on reset of the computer is presently being described, the STR signature is not present, and the decision at decisional block 21 is negative. A discussion of the operation that occurs when the STR signature is found is reserved to a later point in this description. The normal power on reset process continues, represented at operation 23, with the boot loader program requiring CPU 1 to locate the compressed CMS in the flash ROM, decompress the CMS and load that software in the private memory 5 where stored for use in processing. Depending upon the design of the computer, the program may also set up a debugging environment for the processor, prior to decompressing the code morphing software.

Once stored in private memory 5, the boot loader routine "jumps" into the code morphing software at its "reset" vector in private memory 5, as represented at block 25 and begins executing (e.g. starts) the CMS. On starting, the CMS resets the CPU registers and establishes the CPU context, as represented by block 27A, configures other memory, block 27B, and then commences normal processing, the details of which are not relevant or material to the present invention.

Continuing with right side of FIG. 2, during normal processor operation, which in accordance with the present invention includes the sleep mode, the power management subroutine of the BIOS or operating system periodically checks for activity on the processor keyboard and other user input devices, and, as represented by block 10, checks to determine if instructions of an application program are being executed by the processor. The routine also records and stores the time of the last such activity and compares that time to the time of the present check to determine if the interval is greater than a predetermined time, Tmax, represented by decisional block 12. If not, the determination is negative and normal processing activity of the processor continues, as represented at block 14, including periodically repeating the activity check operation indicated by the dotted line to block 10.

Should the period of inactivity continue until the comparison determination results in an interval of greater than Tmax, a flag is set, represented by an affirmative decision at block 12. On finding that flag, the CPU program branches from the main routine to retrieve and execute the Instant STR routine, as represented at block 16

An initial step in the Instant STR routine is to retrieve the part of the CPU context and Northbridge registers that is stored in the CPU's internal memory, and save that context in private memory 5. As represented at block 18, the foregoing state information is stored in the private memory along with the normal X86 execution state information, which the Transmeta processor normally saves in that memory.

Thereafter, the processor initiates the chipset to shut down power to CPU 1 (and other components of the processor), excepting the private memory 5, after a defined short time interval and sets the STR signature, as represented by operation 20. The chipset withdraws the power P1 to the CPU, which ceases operation at this point. Any information in the internal memories of the CPU disappears. Since private memory 5 remains powered up, that is, P2 (FIG. 1) continues, the entire context information is preserved. At this stage the CMS of the Transmeta processor is retained private memory 5.

While shutting down (i.e. before removing the power), CMS detects the Instant STR event and sets a corresponding flag (e.g. the "STR signature") in non-volatile memory. This enables the code morphing software to detect the Instant STR condition upon a power-on-reset, as later herein described. The foregoing flag may be implemented by writing the STR signature into private memory 5 Concurrently additional hardware, such as the Southbridge chip, serves to monitor the user input device 7 (FIG. 1) represented at block 24. If a negative determination is made, the checking continues as indicated at decisional block 26. If, however, any user activity is detected, such as the user's manipulation of any user input device 7, such as keyboard or mouse or the like, then an affirmative determination is made at decisional operation 26 and the computer initiates the operation, represented at block 28 to restore power to the CPU and execute the power up sequence. The latter operation returns the flow to operational block 11, which was earlier described.

The sequence of operation proceeds through the operations represented by operational blocks 13, 15 and 19, earlier described and not here repeated. When the boot loader checks for an STR signature this time as represented at block 19, an affirmative determination is made at decisional block 21. The processor clears the STR signature, 30, skips decompressing CMS as the software resides in the private memory, and, as represented in block 32 directly jumps into the CMS "resume from STR" routine vector in private memory 5. The CMS commences by restoring the internal CPU context and Northbridge registers from the private memory into the appropriate registers of the CPU as represented at operation 34 and configures other memory 36. With internal CPU context restored, all memories configured, and program state present in the private memory, the processor is restored to the state existing at the time of initiation of the sleep mode procedure at which juncture the processor may then retrieve the next instruction of the X86 target application for execution, as represented at block 38. As one appreciates, the foregoing method completes rapidly.

Figure 3:
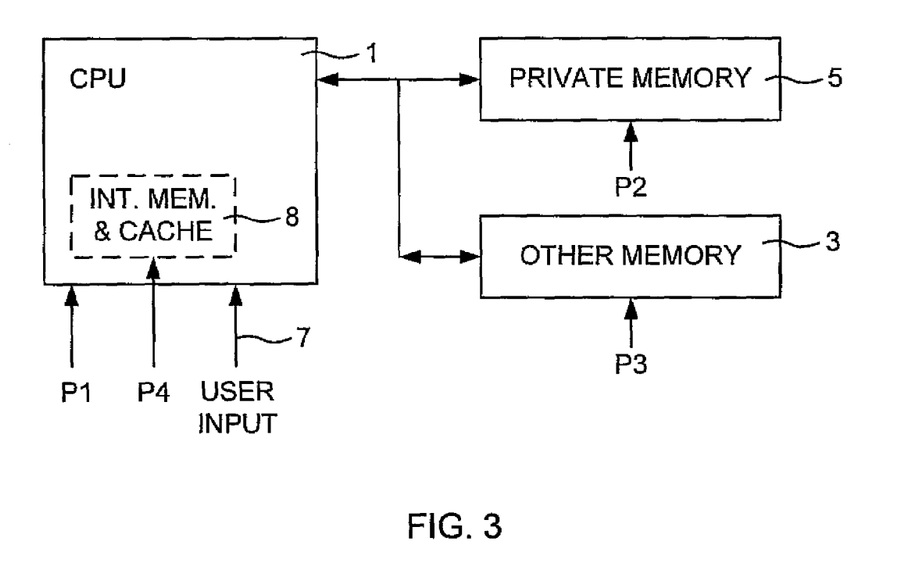
FIG. 3 is a block diagram of a digital processor according to another embodiment of the present invention.

An alternative embodiment of the sleep mode invention would employ faster memory still, but would require modification to the structure of the Transmeta computer. Specifically, where it is practicable to modify the integrated circuit chip that contains the processor of the Transmeta computer so as to permit the on-chip caches to be powered up or down separately from the remaining elements of the processor, then it is possible to retain the internal context of the CPU within the processor during the sleep mode, avoiding the necessity for transferring the internal context to the private memory and back again during resume from the Instant STR procedure. Such a configuration is illustrated in FIG. 3, in which the internal memory and cache 8 are powered by power domain P4, separate from the power domain P1 of the other CPU elements. In as much as the memory employed for cache application is typically the fastest memory available, and the location is physically closer to the principal elements of the processor, propagation time is reduced. Further, the processing time to transfer the information is eliminated. In this embodiment, the memory serves both the function of cache and of the private memory found in the initial embodiment, earlier described.

The foregoing invention may be incorporated within target processing systems that currently employ a sleep mode, such as the X86 system, but requires some modification to the target system's operating software. Since a memory of the X86 system is already powered separately from the CPU of the processing system and for sleep mode operation that memory is already used to store the state of the operating system and the application program, an extra portion of that external memory may be used to also store the internal context of the X86 CPU.

Assume two levels of "sleep" for the X86 type computer: A first level in which the central processing unit (CPU) of the processor maintains the CPU context and a second level, more deep than the first, in which the context of the CPU is not maintained. In the first level, the Southbridge circuit of the processor shuts off (sic "kills") the input clocks to the CPU, but maintains power to the CPU. The BIOS and operating system ("OS") of the computer typically uses the the second level, the Southbridge circuit kills the CPU input clocks, as before, and then also removes electrical power to the CPU and other devices of the processor. As a result of the removal of electrical power, the context information of the CPU state is lost. The BIOS and OS of the computer uses this second state less frequently than the first because the state is high overhead.

The present invention permits transparent power cycling of the CPU, turning the CPU off and then turning the CPU on, repeatedly at will, with low overhead (e.g. virtually maintaining the CPU context). Two embodiments of the invention are thus possible. The invention may replace the STR process found in the X86 processor system. In such an embodiment, the resume process restores the processor more quickly than the existing STR procedure although no savings is made in power consumption.

In a preferred embodiment, the invention replaces the CPU context-maintaining sleep state of the X86 system (e.g. "deep sleep" which is the deepest CPU context maintaining sleep mode) and the invention "tricks" the BIOS and/or OS to "think" that the CPU is placed in the sleep mode, deep sleep, when, in fact, once the BIOS and OS initiates the "deep sleep" action, all electrical power is removed from the CPU and the CPU enters the Instant STR condition. The advantage is that less power is consumed over time than when the CPU is placed in sleep mode. And with the benefit of the very rapid resume from STR action available with the invention the computer user never knows that the CPU had been turned off.

The foregoing second embodiment is possible of accomplishment in two different species. In the first specie of the preferred embodiment the code morphing software of the Transmeta processor intercepts the command issued by the operating system, such as Windows 9X, to shut down the CPU clock input to the CPU. Then the code morphing software issues a command to power down the CPU completely, that is, disable the CPU clock input and also remove electrical power from the CPU. Thus while the operating system "thinks" that the CPU remains powered, in fact, the CPU is completely powered down. In that sense the action is transparent to the X86 OS software and to the BIOS. In existing computers the context of the CPU is lost in this power saving mode. In the present invention the CPU context is saved in private memory 5.

The second species of the preferred embodiment requires the BIOS and/or the OS software to be modified to explicitly invoke an Instant STR operation. It may not be possible to accomplish this in computers that use a "closed" operating system, such as WINDOWS 9X, that can only be modified by the copyright owner, but can be readily accomplished in "open" operating systems, such as the familiar LINUX operating system. In new generations of BIOS and OS software, such a command may be easily incorporated, if timely suggested to the designers of such software.

By powering down the CPU additional power savings may be achieved when the computer is left idle. In the case of present CPU's operating at 600 MHz, the power saving is about sixty milliwatts. That savings would increase for computers in the future that contain future versions of CPU's containing process technology advances that typically allow higher operating frequencies, but result in greater power consumption in sleep mode.

It is believed that the foregoing description of the preferred embodiments of the invention is sufficient in detail to enable one skilled in the art to make and use the invention. However, it is expressly understood that the detail of the elements presented for the foregoing purpose is not intended to limit the scope of the invention, in as much as equivalents to those elements and other modifications thereof, all of which come within the scope of the invention, will become apparent to those skilled in the art upon reading this specification. Thus, the invention is to be broadly construed within the full scope of the appended claims.

What is claimed is:

1. A method of operating a processor having one or more registers and running a program comprising a first instruction and a next instruction from a first instruction set, said method comprising:
    executing said first instruction;
    in response to said executing, (i) saving the register context of said registers without executing any instructions from said first instruction set; and (ii) removing power from said processor after said saving;
    returning power to said processor after said removing;
    after said returning, restoring said saved register context without executing any instructions from said first instruction set; and
    resuming said running of said program with said next instruction.

2. The method of claim 1 wherein said saving is performed by an instruction sequence chosen from a second instruction set.

3. The method of claim 2 wherein said restoring is performed by a second instruction sequence chosen from said second instruction set.

4. The method of claim 3 wherein said first instruction set comprises an x86 instruction set.

5. The method of claim 1 wherein said program accesses a first memory and said saving accesses a second memory not accessible by said program.

6. The method of claim 1 wherein said second memory is powered independently of said processor.

7. The method of claim 1 further comprising setting a flag in response to said removing power.

8. The method of claim 1 further comprising:
    intercepting a command to shut down the clock input to said processor; and
    in response to said command, disabling said clock input and removing said power from said processor.

9. The method of claim 1 where said removing power comprises removing sufficient power to lose said register context.

10. The method of claim 9 wherein said step of removing sufficient power comprises removing all power.

11. The method of claim 1 wherein said saving comprises storing said register context in a memory.

12. The method of claim 11 wherein said memory and said registers retain state independently of each other.

13. The method of claim 11 wherein said memory is powered independently of said processor.

14. The method of claim 11 wherein said memory and said registers are in separate power domains.

15. The method of claim 11 wherein said memory is not addressable by said first instruction set.

16. The method of claim 11 wherein said memory is not accessible by any instruction from said first instruction set.

17. The method of claim 11 wherein said memory is not visible to any instruction from said first instruction set.

18. The method of claim 11 wherein said memory is private with respect to said first instruction set.

19. The method of claim 11 wherein said memory is internal to said processor.

20. The method of claim 19 wherein said processor is on an integrated circuit and said memory is on said integrated circuit.

21. The method of claim 11 wherein said memory is external to said processor.

22. The method of claim 1 wherein said first instruction set comprises an x86 instruction set.

23. The method of claim 1 wherein instructions from said first instruction set may be executed in a plurality of modes.

24. The method of claim 23 wherein said plurality of modes comprises a real mode and a protected mode.

25. The method of claim 23 wherein said plurality of modes comprises a privileged mode and a non-privileged mode.

26. The method of claim 23 wherein said first instruction set comprises an x86 instruction set and said plurality of modes comprises a real mode, a protected mode and a system management mode.

27. The method of claim 1 wherein said processor has additional context, and said method further comprises:
before said removing power, saving at least a portion of said additional context without executing any additional instructions from said first instruction set; and
after said returning power, restoring said saved portion without executing any additional instructions from said first instruction set.

28. The method of claim 27 wherein said portion is in system component registers.

29. The method of claim 28 wherein said system component registers comprise Northbridge registers.

30. The method of claim 27 wherein said portion is in a cache.

31. The method of claim 27 wherein said portion comprises at least a part of the internal state of said processor.

32. The method of claim 1 wherein said saving comprises executing microcode.

33. The method of claim 1 wherein said running comprises interpreting instructions from said first instruction set.

34. The method of claim 33 wherein said running comprises translating instructions from said first instruction set.

35. A computer system comprising:
a central processing unit (CPU) comprising a first memory accessible only to said CPU; and
a second memory coupled to said CPU, said memory unit containing instructions that when executed implement a computer-implemented method of operating said processor, said method comprising:
executing a first instruction of a first instruction set of a program to place said processor into a state;
saving said state without executing any instructions from said first instruction set;
removing power from said processor after said saving;
returning power to said processor after said removing;
after said returning, restoring said state without executing any instructions from said first instruction set; and
resuming said running of said program with a next instruction of said first instruction set.

36. The computer system of claim 35 wherein said saving is performed by an instruction sequence chosen from a second instruction set.

37. The computer system of claim 36 wherein said restoring is performed by a second instruction sequence chosen from said second instruction set.

38. The computer system of claim 37 wherein said first instruction set comprises an x86 instruction set.

39. The computer system of claim 35 wherein said program accesses a first memory and said saving accesses a second memory not accessible by said program.

40. The computer system of claim 35 wherein said second memory is powered independently of said processor.

41. The computer system of claim 35 wherein said method further comprises setting a flag in response to said removing power.

42. A computer-readable medium embodying instructions that cause a computer to perform a method of operating a processor running a program comprising a first instruction and a next instruction from a first instruction set, said method comprising:
executing said first instruction to place said processor into a state;
saving said state without executing any instructions from said first instruction set;
removing power from said processor after said saving;
returning power to said processor after said removing;
after said returning, restoring said state without executing any instructions from said first instruction set; and
resuming said running of said program with said next instruction.

43. The computer-readable medium of claim 42 wherein said saving is performed by an instruction sequence chosen from a second instruction set.

44. The computer-readable medium of claim 43 wherein said restoring is performed by a second instruction sequence chosen from said second instruction set.

45. The computer-readable medium of claim 44 wherein said first instruction set comprises an x86 instruction set.

46. The computer-readable medium of claim 42 wherein said program accesses a first memory and said saving accesses a second memory not accessible by said program.

47. A method of operating a CPU including one or more registers and running a program comprising a first instruction from a first instruction set, said method comprising:
executing said first instruction;
in response to said executing, (i) saving the state of said registers without executing any additional instructions from said first instruction set; and (ii) initiating an action that may cause the state of said registers to become undefined; and
restoring said saved state of said registers without executing any additional instructions from said first instruction set.

48. The method of claim 47 wherein said CPU has additional context, and said method further comprises:
in response to said executing, saving at least a portion of said additional context without executing any additional instructions from said first instruction set; and restoring said saved portion without executing any additional instructions from said first instruction set.

49. The method of claim 48 wherein said portion is in system component registers.

50. The method of claim 49 wherein said system component registers comprise Northbridge registers.

51. The method of claim 48 wherein said portion is in a cache.

52. The method of claim 48 wherein said portion comprises at least a part of the internal state of said CPU.

53. The method of claim 48 wherein said portion comprises a register context.

54. The method of claim 47 wherein said action comprises powering down said CPU.

55. The method of claim 47 wherein said action comprises removing sufficient power from said CPU such that said state may become undefined.

56. The method of claim 55 wherein said step of removing sufficient power comprises removing all power.

57. The method of claim 47 wherein said action comprises turning off power to said CPU.

58. The method of claim 47 wherein said program has a second instruction from said first instruction set, said method comprising:
    after said restoring, continuing said running of said program with said second instruction wherein said second instruction programmatically follows said first instruction.

59. The method of claim 47 wherein said program has a second instruction from said first instruction set, said method comprising:
    after said restoring, continuing said running of said program with said second instruction wherein said second instruction is the next instruction of said program after said first instruction.

60. The method of claim 47 wherein said saving comprises storing said state in a memory.

61. The method of claim 60 wherein said memory and said registers retain state independently of each other.

62. The method of claim 60 wherein said memory is powered independently of said registers.

63. The method of claim 60 wherein said memory and said registers are in separate power domains.

64. The method of claim 60 wherein said memory is not addressable by said first instruction set.

65. The method of claim 60 wherein said memory is not accessible by any instruction from said first instruction set.

66. The method of claim 60 wherein said memory is not visible to any instruction from said first instruction set.

67. The method of claim 60 wherein said memory is private with respect to said first instruction set.

68. The method of claim 60 wherein said memory is internal to said CPU.

69. The method of claim 68 wherein said CPU is on an integrated circuit and said memory is on said integrated circuit.

70. The method of claim 60 wherein said memory is external to said CPU.

71. The method of claim 47 wherein said first instruction set is an x86 instruction set.

72. The method of claim 47 wherein instructions from said first instruction set may be executed in a plurality of modes.

73. The method of claim 72 wherein said plurality of modes comprises a real mode and a protected mode.

74. The method of claim 72 wherein said first instruction set comprises an x86 instruction set and said plurality of modes comprises a real mode, a protected mode and a system management mode.

75. The method of claim 72 wherein said plurality of modes comprises a privileged mode and a non-privileged mode.

76. The method of claim 47 wherein said saving comprises executing instructions from a second instruction set.

77. The method of claim 47 wherein said saving comprises executing microcode.

78. The method of claim 47 wherein said running comprises interpreting instructions from said first instruction set.

79. The method of claim 78 wherein said running comprising translating instructions from said first instruction set.

80. The method of claim 47 wherein said saving comprises interpreting said first instruction.

81. The method of claim 47 wherein said restoring comprises executing instructions from a second instruction set.

82. The method of claim 47 wherein said restoring comprises executing microcode.

83. The method of claim 47 wherein said saving comprises setting a flag and said restoring comprises checking said flag.

84. The method of claim 83 wherein said flag comprises a signature.

85. A method of operating a CPU including one or more registers and running a program comprising a first instruction from a first instruction set, said method comprising:
    executing said first instruction;
    in response to said executing, saving the state of said registers without executing any additional instructions from said first instruction set; and
    restoring said saved state of said registers without executing any additional instructions from said first instruction set if power to the CPU has been lost.

86. The method of claim 85 wherein said CPU has additional context, and said method further comprises:
    in response to said executing, saving at least a portion of said additional context in a memory without executing any additional instructions from said first instruction set; and
    restoring said saved portion without executing any additional instructions from said first instruction set.

87. The method of claim 86 wherein said portion is in system component registers.

88. The method of claim 87 wherein said system component registers comprise Northbridge registers.

89. The method of claim 86 wherein said portion is in a cache.

90. The method of claim 86 wherein said portion comprises at least a part of the internal state of said CPU.

91. A method of operating a CPU including one or more registers and running a program comprising a first instruction from a first instruction set, said method comprising:
    executing said first instruction;
    in response to said executing, (i) saving the state of said registers without executing any additional instructions from said first instruction set; and (ii) stopping further execution of instructions; and
    restoring said state of said registers without executing any additional instructions from said first instruction set.

92. The method of claim 91 wherein said CPU has additional context, and said method further comprises:
    in response to said executing, saving at least a portion of said additional context in a memory without executing any additional instructions from said first instruction set; and restoring said saved portion without executing any additional instructions from said first instruction set.

93. The method of claim 92 wherein said portion is in system component registers.

94. The method of claim 93 wherein said system component registers comprise Northbridge registers.

95. The method of claim 92 wherein said portion is in a cache.

96. The method of claim 92 wherein said portion comprises at least a part of the internal state of said CPU.

97. A method of operating a processor and one or more system components, said processor having registers and running a program comprising a first instruction from a first instruction set, said method comprising:
   executing said first instruction;
   in response to said executing, (i) saving the states of said registers and said system components, without executing any additional instructions from said first instruction set; and (ii) initiating an action that may cause the state of said registers or the state of said system components to become undefined; and
   restoring said saved state of said registers and said system components without executing any additional instructions from said first instruction set.

98. The method of claim 97 wherein said processor is on an integrated circuit and said system components are on said integrated circuit.

99. The method of claim 97 wherein said system components comprise a Northbridge.

100. The method of claim 97 wherein said CPU has additional context, and said method further comprises:
   in response to said executing, saving at least a portion of said additional context in a memory without executing any additional instructions from said first instruction set; and
   restoring said saved portion without executing any additional instructions from said first instruction set.

101. The method of claim 100 wherein said portion is in a cache.

102. The method of claim 100 wherein said portion comprises at least a part of the internal state of said CPU.

103. A CPU for executing instructions from a first instruction set, said CPU comprising:
   one or more registers holding a state; wherein
   said CPU is adapted, upon executing a first instruction from said first instruction set, (i) to save said state in a memory without executing any additional instructions from said first instruction set; and (ii) to initiate an action that may cause the state of said registers to become undefined; and
   said CPU is adapted, in response to an event, to restore the saved state of said registers from said memory without executing any additional instructions from said first instruction set.

104. The CPU of claim 103, wherein said CPU is further adapted, after restoring said state, to execute a second instruction from said first instruction set where said second instruction programmatically follows said first instruction.

105. The CPU of claim 103, wherein said CPU is further adapted, after restoring said state, to execute a second instruction where said second instruction is the next instruction in said first instruction set to be executed after said first instruction.

106. The CPU of claim 103 wherein said action comprises powering down said CPU.

107. The CPU of claim 103 wherein said action comprises removing sufficient power from said CPU such that said state may become undefined.

108. The CPU of claim 107 wherein said removing sufficient power comprises removing all power.

109. The CPU of claim 103 wherein said action comprises turning off power to said CPU.

110. The CPU of claim 103 wherein said event comprises detection of activity.

111. The CPU of claim 103 wherein said event comprises restoration of power to said CPU.

112. The CPU of claim 111 wherein said restoration of power comprises restoration of full power.

113. The CPU of claim 103 wherein said memory is not visible to instructions from said first instruction set.

114. The CPU of claim 103 wherein said memory is not addressable by said first instruction set.

115. The CPU of claim 103 wherein said memory is not accessible by instructions from said first instruction set.

116. The CPU of claim 103 wherein said memory is private with respect to said first instruction set.

117. The CPU of claim 103 wherein said memory and said registers retain state independently of each other.

118. The CPU of claim 103 wherein said memory is powered independently of said registers.

119. The CPU of claim 103 wherein said memory and said registers are in separate power domains.

120. The CPU of claim 103 wherein said memory is internal to said CPU.

121. The CPU of claim 120 wherein said CPU is on an integrated circuit and said memory is on said integrated circuit.

122. The CPU of claim 103 wherein said memory is external to said CPU.

123. The CPU of claim 103 wherein said first instruction set is an x86 instruction set.

124. The CPU of claim 103 wherein instructions from said first instruction set may be executed in a plurality of modes.

125. The CPU of claim 124 wherein said plurality of modes comprises a real mode and a protected mode.

126. The CPU of claim 124 wherein said first instruction set comprises an x86 instruction set and said plurality of modes comprises a real mode, a protected mode and a system management mode.

127. The CPU of claim 124 wherein said plurality of modes comprises a privileged mode and a non-privileged mode.

128. The CPU of claim 103 wherein said adaptation to save comprises an adaptation to execute instructions from a second instruction set.

129. The CPU of claim 103 wherein said adaptation to save comprises an adaptation to execute microcode.

130. The CPU of claim 103 wherein said CPU is adapted to interpret instructions from said first instruction set.

131. The CPU of claim 130 wherein said CPU is adapted to translate instructions from said first instruction set.

132. The CPU of claim 103 wherein said adaptation to save comprises interpreting said first instruction.

133. The CPU of claim 103 wherein said adaptation to restore comprises an adaptation to execute instructions from a second instruction set.

134. The CPU of claim 103 wherein said adaptation to restore comprises an adaptation to execute microcode.

135. The CPU of claim 103, further comprising:
   a flag;
   wherein said adaptation to save further comprises an adaptation to set said flag; and said adaptation to restore comprises checking said flag.

136. The CPU of claim 135 wherein said flag comprises a signature.

137. The CPU of claim 103 wherein CPU has additional context, and said CPU further comprises:
- said executing adaptation is further adapted to save at least a portion of said additional context without executing any additional instructions from said first instruction set; and
- said CPU is adapted, in response to said event to restore said saved portion without executing any additional instructions from said first instruction set.

138. The CPU of claim 137 wherein said portion is in system component registers.

139. The CPU of claim 138 wherein said system component registers comprise Northbridge registers.

140. The CPU of claim 137 wherein said portion is in a cache.

141. The CPU of claim 137 wherein said portion comprises at least a part of the internal state of said CPU.

142. A method of operating a CPU running a program comprising a first instruction from a first instruction set and having one or more registers holding program counter information, said method comprising:
- executing said first instruction;
- in response to said executing, (i) saving the program counter information without executing any additional instructions from said first instruction set; and (ii) initiating an action that may cause said program counter information to become undefined; and
- restoring said saved program counter information without executing any additional instructions from said first instruction set.

143. The method of claim 142 wherein said CPU has additional context, and said method further comprises:
- in response to said executing, saving at least a portion of said additional context in a memory without executing any additional instructions from said first instruction set; and
- restoring said saved portion without executing any additional instructions from said first instruction set.

144. The method of claim 143 wherein said portion is in additional CPU registers.

145. The method of claim 143 wherein said portion is in system component registers.

146. The method of claim 145 wherein said system component registers comprise Northbridge registers.

147. The method of claim 143 wherein said portion is in a cache.

148. The method of claim 143 wherein said portion comprises at least a part of the internal state of said CPU.

149. The method of claim 143 wherein said portion comprises a register context.

150. A CPU for executing instructions from a first instruction set, said CPU comprising:
- one or more registers holding program counter information; wherein
- said CPU is adapted, upon executing a first instruction from said first instruction set, (i) to save the program counter information without executing any additional instructions from said first instruction set; and (ii) to initiate an action that may cause said program counter information to become undefined; and
- said CPU is adapted, in response to an event, to restore said saved program counter information without executing any additional instructions from said first instruction set.

151. The CPU of claim 150 wherein CPU has additional context, and said CPU further comprises:
- said executing adaptation is further adapted to save at least a portion of said additional context without executing any additional instructions from said first instruction set; and
- said CPU is adapted, in response to said event to restore said saved portion without executing any additional instructions from said first instruction set.

152. The CPU of claim 151 wherein said portion is in additional CPU registers.

153. The method of claim 151 wherein said portion is in system component registers.

154. The method of claim 153 wherein said system component registers comprise Northbridge registers.

155. The CPU of claim 151 wherein said portion is in a cache.

156. The CPU of claim 151 wherein said portion comprises at least a part of the internal state of said CPU.

157. The CPU of claim 151 wherein said portion comprises a register context.

* * * * *